US012179567B1

(12) United States Patent
Williams, Jr.

(10) Patent No.: US 12,179,567 B1
(45) Date of Patent: Dec. 31, 2024

(54) SUNROOF FOR GOLF CARTS

(71) Applicant: Kelsow Williams, Jr., Cottonport, LA (US)

(72) Inventor: Kelsow Williams, Jr., Cottonport, LA (US)

( * ) Notice: Subject to any disclaimer, the term of this patent is extended or adjusted under 35 U.S.C. 154(b) by 236 days.

(21) Appl. No.: 17/903,093

(22) Filed: Sep. 6, 2022

(51) Int. Cl.
B62D 25/06 (2006.01)
B60J 7/02 (2006.01)
B60J 10/82 (2016.01)
B62D 21/18 (2006.01)

(52) U.S. Cl.
CPC .............. B60J 7/02 (2013.01); B60J 10/82 (2016.02); B62D 21/183 (2013.01); B62D 25/06 (2013.01)

(58) Field of Classification Search
CPC ..... B60J 10/80; B60J 10/82; B60J 7/02; B60J 7/04; B60J 7/041; B60J 7/043; B60J 7/047; B62D 25/06
USPC .............. 296/216.05, 220.01, 216.04, 6, 218
See application file for complete search history.

(56) References Cited

U.S. PATENT DOCUMENTS

| 2,041,281 | A | * | 5/1936 | Bishop | B60J 7/192 292/300 |
| 6,220,657 | B1 | * | 4/2001 | Rea | B60J 7/04 296/220.01 |
| 8,366,187 | B2 | | 2/2013 | Mihashi | |
| D707,623 | S | | 6/2014 | Marks | |
| 9,296,283 | B2 | | 3/2016 | Nagashima | |
| 9,845,002 | B2 | * | 12/2017 | Nellen | B60J 7/047 |
| 9,855,920 | B2 | * | 1/2018 | Castello | B60S 1/026 |
| 10,899,203 | B2 | | 1/2021 | Hiramatsu | |
| D920,887 | S | | 6/2021 | Lovati | |
| 11,279,424 | B1 | | 3/2022 | Hinrichs | |
| 11,292,323 | B2 | | 4/2022 | Nonami | |
| 2021/0122218 | A1 | | 4/2021 | Ritchey | |

* cited by examiner

Primary Examiner — Dennis H Pedder
(74) Attorney, Agent, or Firm — Kyle A. Fletcher, Esq.

(57) ABSTRACT

The sunroof for golf carts is a vehicle. The sunroof for golf carts comprises a golf cart and a sunroof structure. The sunroof for golf carts forms a cab. The cab forms a protected space used to transport one or more passengers. The sunroof structure forms a port structure that allows sunlight to enter the cab. The port structure formed by the sunroof structure further allows air to flow into the cab.

11 Claims, 4 Drawing Sheets

SUNROOF FOR GOLF CARTS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of non-fixed vehicle roofs with movable panels. (B60J7/00)

SUMMARY OF INVENTION

The sunroof for golf carts is a vehicle. The sunroof for golf carts comprises a golf cart and a sunroof structure. The sunroof for golf carts forms a cab. The cab forms a protected space used to transport one or more passengers. The sunroof structure forms a port structure that allows sunlight to enter the cab. The port structure formed by the sunroof structure further allows air to flow into the cab.

These together with additional objects, features and advantages of the sunroof for golf carts will be readily apparent to those of ordinary skill in the art upon reading the following detailed description of the presently preferred, but nonetheless illustrative, embodiments when taken in conjunction with the accompanying drawings.

In this respect, before explaining the current embodiments of the sunroof for golf carts in detail, it is to be understood that the sunroof for golf carts is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the sunroof for golf carts.

It is therefore important that the claims be regarded as including such equivalent construction insofar as they do not depart from the spirit and scope of the sunroof for golf carts. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
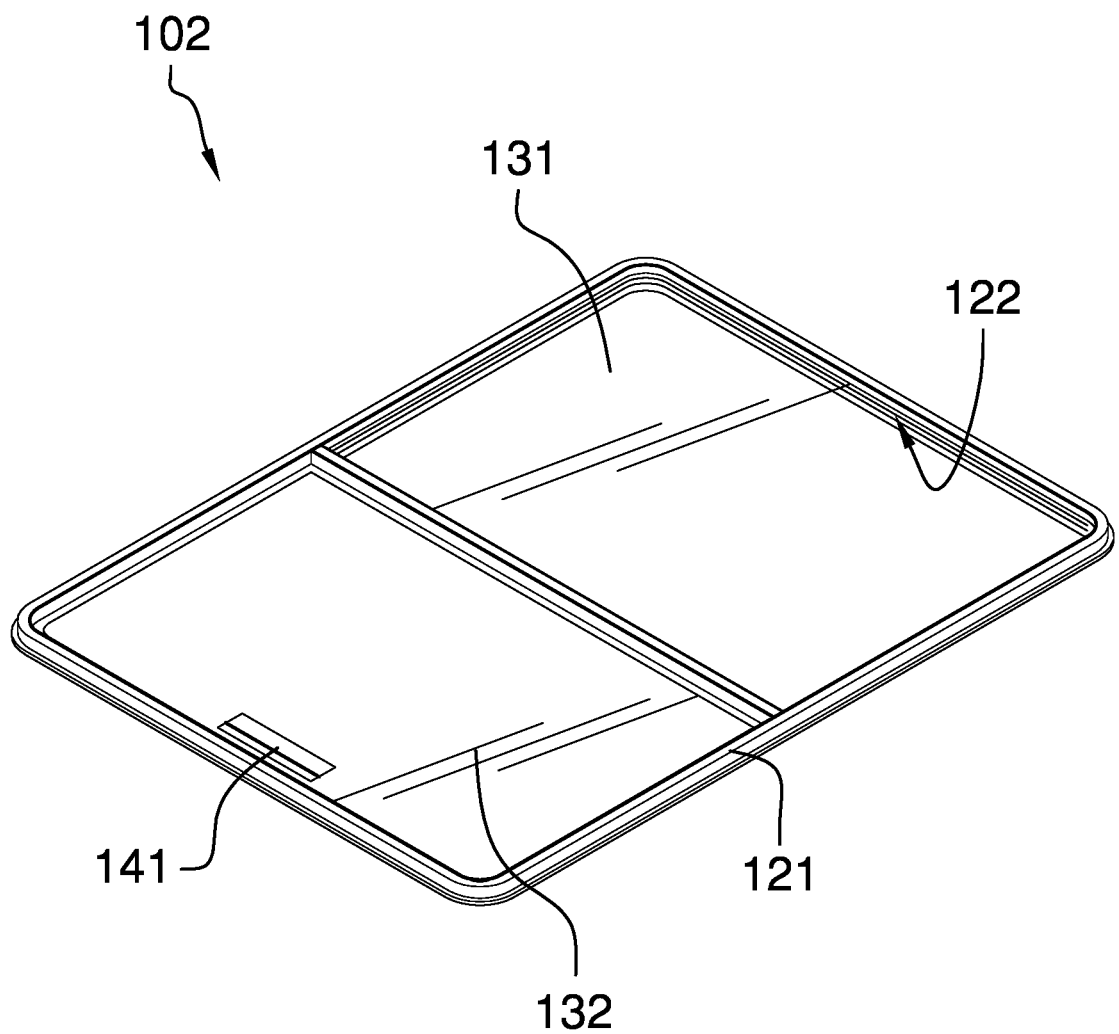
FIG. 1 is a perspective view of an embodiment of the disclosure.
Figure 2:
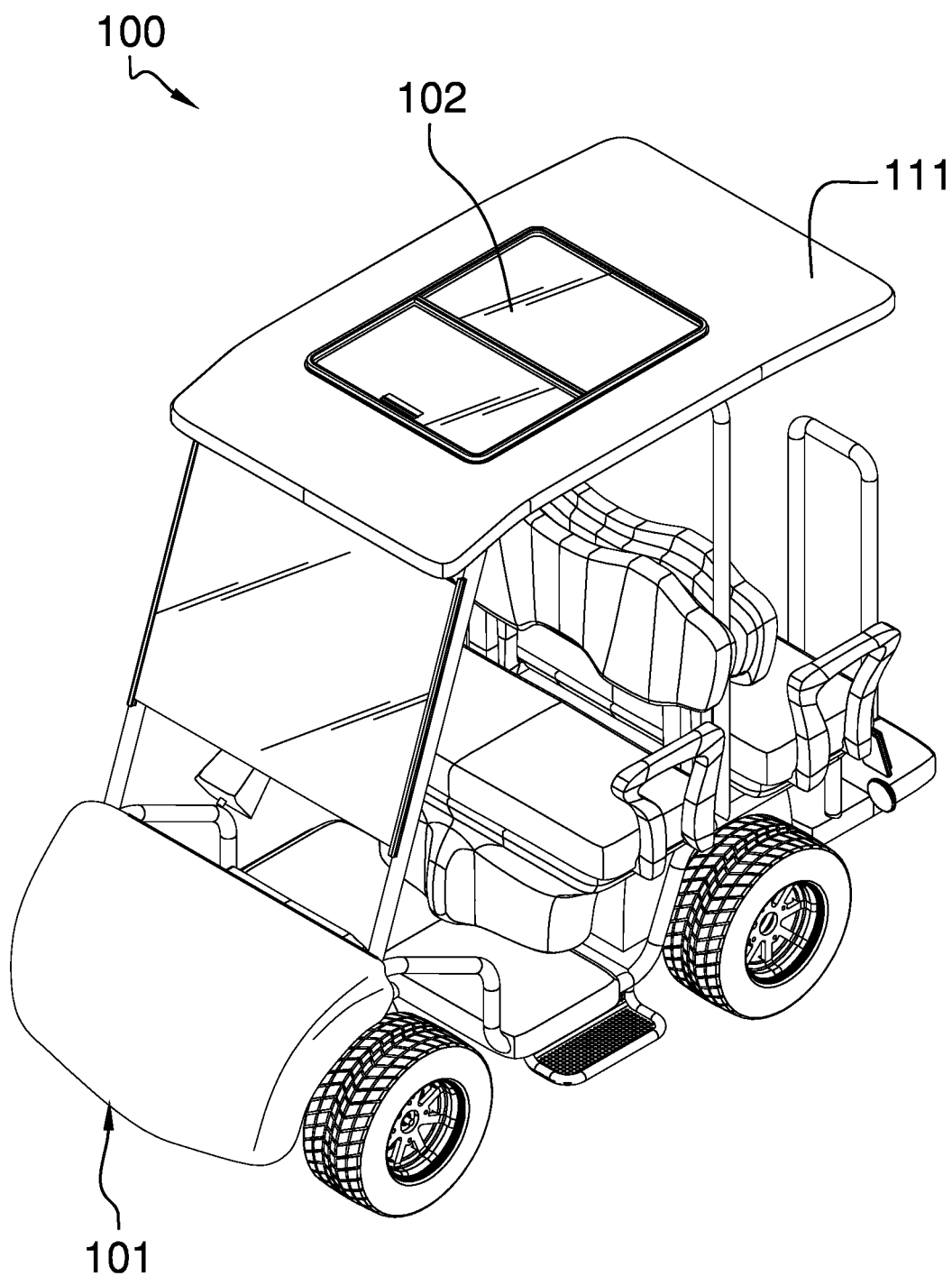
FIG. 2 is an in-use view of an embodiment of the disclosure.
Figure 3:
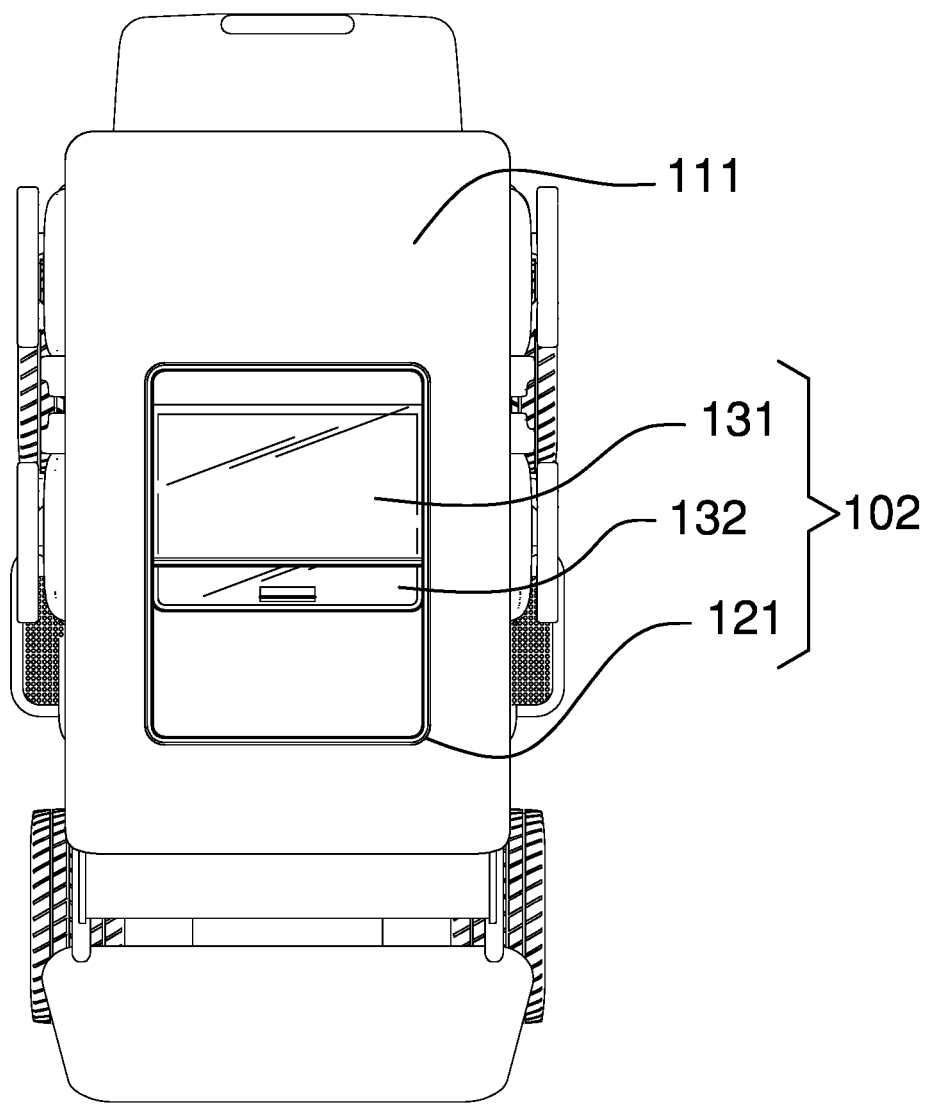
FIG. 3 is a top view of an embodiment of the disclosure.
Figure 4:
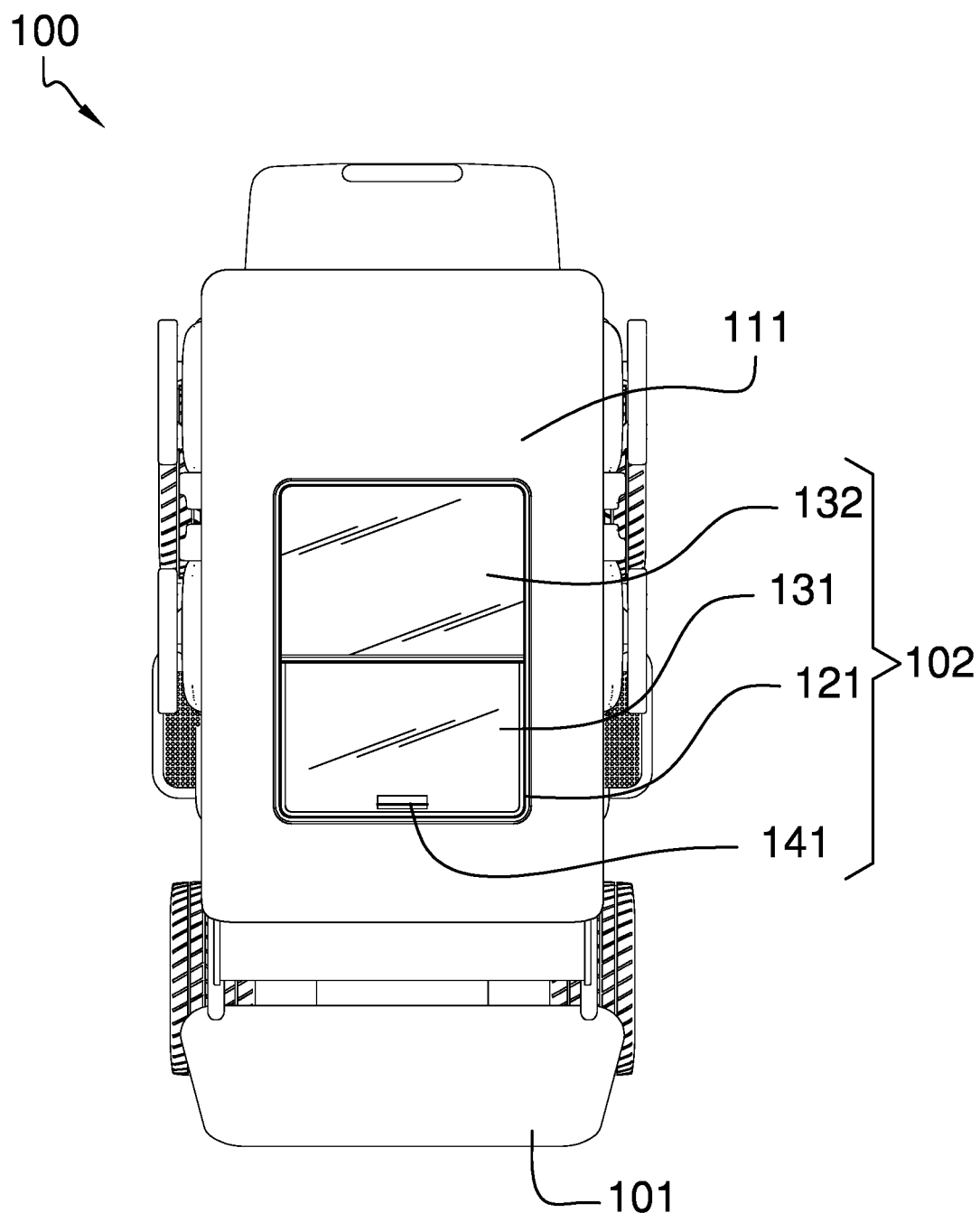
FIG. 4 is a top view of an embodiment of the disclosure.

Detailed reference will now be made to one or more potential embodiments of the disclosure, which are illustrated in FIGS. 1 through 4.

The sunroof for golf carts 100 (hereinafter invention) is a vehicle. The invention 100 comprises a golf cart 101 and a sunroof structure. The golf cart 101 forms a cab. The cab forms a protected space used to transport one or more passengers. The sunroof structure 102 forms a port structure that allows sunlight to enter the cab. The port structure formed by the sunroof structure 102 further allows air to flow into the cab.

The golf cart 101 is a motorized vehicle. The golf cart 101 is adapted for use in transporting one or more passengers. The golf cart 101 forms a cab. The cab is a protected space. The one or more passengers remain in the cab when the golf cart 101 transports the one or more passengers. The golf cart 101 further comprises a roof 111. The roof 111 forms the superior structure of the protected space formed by the cab of the golf cart 101. The roof 111 forms a barrier that prevents precipitation from entering the protected space formed by the cab of the golf cart 101. The sunroof structure 102 permanently mounts in the roof 111.

The sunroof structure 102 is a window. The sunroof structure 102 mounts in the roof 111 of the golf cart 101. The sunroof structure 102 is a transparent structure. The sunroof structure 102 allows light to enter the cab of the golf cart 101 through the roof 111. The sunroof structure 102 is a mechanical structure. The perimetrical boundary of the sunroof structure is a disk shaped structure. The sunroof structure 102 moves between a closed position and an open position.

The sunroof structure 102 is a fluid impermeable structure in the closed position. Fluids are prevented from passing through the sunroof structure 102 when the sunroof structure 102 is in the closed position. Fluids flow through the sunroof structure 102 when the sunroof structure 102 is in the open position. The sunroof structure 102 forms a fluid impermeable seal between the sunroof structure 102 and the roof 111 of the golf cart 101.

The sunroof structure 102 is a transparent structure. Light passes through the sunroof structure 102 when the sunroof structure 102 is in the closed position. Light passes through the sunroof structure 102 when the sunroof structure 102 is in the open position.

The sunroof structure 102 comprises a frame 121, a panel track 122, a first transparent panel 131, and a second transparent panel 132.

The frame 121 forms the perimeter of the structure formed by the panel track 122, the first transparent panel 131, and the second transparent panel 132. The frame 121 aligns with the lateral faces of the perimetrical boundary of the sunroof structure 102. The frame 121 forms a ring shaped structure. The frame 121 forms the structure of the sunroof structure 102 that attaches to the roof 111. The ring structure of the frame 121 forms an aperture through the roof 111 of the golf cart 101.

The panel track 122 is a fastening device. The panel track 122 secures the first transparent panel 131 and the second transparent panel 132 to the frame 121. The first transparent panel 131 mounts in the panel track 122 such that the first transparent panel 131 maintains a fixed position relative to the roof 111 of the golf cart 101. The second transparent panel 132 mounts in the panel track 122 such that the second transparent panel 132 moves relative to the first transparent panel 131. The second transparent panel 132 moves within the panel track 122 between the closed position and the open position.

The first transparent panel 131 is a roughly disk shaped structure. The first transparent panel 131 is a transparent structure. The first transparent panel 131 is a solid structure. The first transparent panel 131 is a fluid impermeable structure. The first transparent panel 131 mounts in the panel track 122 such that the first transparent panel 131 forms a fluid impermeable seal with the panel track 122. The first transparent panel 131 forms a portion of the superior boundary of the protected space formed by the cab of the golf cart 101.

The position of the first transparent panel 131 relative to the panel track 122 remains fixed. The second transparent panel is a roughly disk shaped structure. The second transparent panel 132 is a transparent structure. The second transparent panel 132 is a solid structure. The second transparent panel 132 is a fluid impermeable structure. The second transparent panel 132 mounts in the panel track 122 such that the second transparent panel 132 forms a fluid impermeable seal with the panel track 122. The second transparent panel 132 forms a portion of the superior boundary of the protected space formed by the cab of the golf cart 101. The position of the second transparent panel 132 within the panel track 122 moves relative to the first transparent panel 131. The second transparent panel 132 moves between the closed position and the open position. The second transparent panel 132 controls the flow of air through the sunroof structure 102.

The second transparent panel 132 further comprises a handle 141. The handle 141 is a grip that mounts on the second transparent panel 132. The handle 141 is accessible from the protected space formed by the cab of the golf cart 101. The handle 141 facilitates moving the second transparent panel 132 between the closed position and the open position.

The following definitions were used in this disclosure:

Barrier: As used in this disclosure, a barrier is a physical obstacle that forms a boundary between a first space and a second space. The barrier prevents the passage of an object between the first space and the second space.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Closed Position: As used in this disclosure, a closed position refers to a movable barrier structure that is in an orientation that prevents passage through a port or an aperture. The closed position is often referred to as an object being "closed."

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Gas: As used in this disclosure, a gas refers to a state (phase) of matter that is fluid and that fills the volume of the structure that contains it. Stated differently, the volume of a gas always equals the volume of its container.

Liquid: As used in this disclosure, a liquid refers to a state (phase) of matter that is fluid and that maintains, for a given pressure, a fixed volume that is independent of the volume of the container.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Open Position: As used in this disclosure, an open position refers to a movable barrier structure that is in an orientation that allows passage through a port or an aperture. The open position is often referred to as an object being "open."

Optical Filter: As used in this disclosure, an optical filter is a semi-transparent structure that in any combination: 1) reduces the amount of light that passes through the optical filter; 2) allows only light of specified wavelengths to pass through the optical filter; or, 3) blocks light of specified wavelengths from through the optical filter.

Orientation: As used in this disclosure, orientation refers to the positioning of a first object relative to: 1) a second object; or, 2) a fixed position, location, or direction.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Phase: As used in this disclosure, phase refers to the state of the form of matter. The common states of matter are solid, liquid, gas, and plasma.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Ring: As used in this disclosure, a ring is a term that is used to describe a disk-like structure through which a negative space is formed through the faces of the disk-like structure. Rings are often considered loops.

Roof: As used in this disclosure, a roof refers to the superior surface of a hollow structure. The roof typically encloses the hollow structure. The interior surface of the roof of a vehicle is often called a headliner.

Roughly: As used in this disclosure, roughly refers to a comparison between two objects. Roughly means that the difference between one or more parameters of the two compared objects are not significantly different.

Solid: As used in this disclosure, a solid refers to a state (phase) of matter that: 1) has a fixed volume; and, 2) does not flow.

Tinted: As used in this this disclosure, a tinted object is an first object made of first transparent material that has been coated, treated, or processed with a second material that reduces the amount of light that passes through the transparent material of the first object while not significantly scattering the light that passes through the first transparent material such that object behind the first object would remain clearly visible.

Track: As used in this disclosure, a track is a physical structural relationship between a first object and a second object that serves a purpose selected from the group consisting of: 1) fastening the second object to the first object; 2) controlling the path of motion of the first object relative to the second object in at least one dimension and in a maximum of two dimensions; or, 3) a combination of the first two elements of this group.

Transparent: As used in this disclosure, transparent refers to a material that allows light to pass through the material without significant scattering such that an object can be clearly seen through the material.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The passenger space of a vehicle is known as a cab.

Window: As used in this disclosure, a window is an opening in the body of a vehicle that is fitted with glass or other transparent material in a frame to admit light or air and that allows people to see out. Windshields and windscreens are explicitly considered to be windows in this definition.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A sunroof for golf carts comprising
a golf cart and a sunroof structure;
wherein the sunroof structure mounts on the golf cart;
wherein the golf cart forms a cab;
wherein the sunroof structure forms a port structure that allows sunlight to enter the cab;

wherein the port structure formed by the sunroof structure further allows air to flow into the cab;
wherein the golf cart further comprises a roof;
wherein the roof forms a barrier;
wherein the sunroof structure is a window permanently mounted in the roof of the golf cart;
wherein the sunroof structure comprises a frame, a panel track, a first transparent panel, and a second transparent panel;
wherein the panel track secures the first transparent panel and the second transparent panel to the frame.

2. The sunroof for golf carts according to claim 1
wherein the golf cart is a motorized vehicle;
wherein the golf cart is adapted for use in transporting one or more passengers;
wherein the cab forms a protected space used to transport one or more passengers.

3. The sunroof for golf carts according to claim 2
wherein the roof forms the superior structure of the protected space formed by the cab of the golf cart.

4. The sunroof for golf carts according to claim 3
wherein the sunroof structure is a transparent structure;
wherein the sunroof structure is a mechanical structure.

5. The sunroof for golf carts according to claim 4
wherein the perimetrical boundary of the sunroof structure is a disk shaped structure;
wherein the sunroof structure moves between a closed position and an open position;
wherein the sunroof structure is a fluid impermeable structure in the closed position;
wherein fluids flow through the sunroof structure when the sunroof structure is in the open position.

6. The sunroof for golf carts according to claim 5 wherein the sunroof structure forms a fluid impermeable seal between the sunroof structure and the roof of the golf cart.

7. The sunroof for golf carts according to claim 6 wherein the frame forms the perimeter of the structure formed by the panel track, the first transparent panel, and the second transparent panel.

8. The sunroof for golf carts according to claim 7
wherein the frame aligns with the lateral faces of the perimetrical boundary of the sunroof structure;
wherein the frame forms a ring shaped structure;
wherein the frame forms the structure of the sunroof structure that attaches to the roof;
wherein the ring structure of the frame forms an aperture through the roof of the golf cart.

9. The sunroof for golf carts according to claim 8
wherein the panel track is a fastening device;
wherein the first transparent panel mounts in the panel track such that the first transparent panel maintains a fixed position relative to the roof of the golf cart;
wherein the second transparent panel mounts in the panel track such that the second transparent panel moves relative to the first transparent panel;
wherein the second transparent panel moves within the panel track between the closed position and the open position.

10. The sunroof for golf carts according to claim 9
wherein the second transparent panel is a roughly disk shaped structure;
wherein the second transparent panel is a transparent structure;
wherein the second transparent panel is a solid structure;
wherein the second transparent panel is a fluid impermeable structure;
wherein the second transparent panel mounts in the panel track such that the second transparent panel forms a fluid impermeable seal with the panel track;
wherein the second transparent panel forms a portion of the superior boundary of the protected space formed by the cab of the golf cart;
wherein the position of the second transparent panel within the panel track moves relative to the first transparent panel;
wherein the second transparent panel moves between the closed position and the open position;
wherein the second transparent panel controls the flow of air through the sunroof structure.

11. The sunroof for golf carts according to claim 10
wherein the second transparent panel further comprises a handle;
wherein the handle is a grip that mounts on the second transparent panel;
wherein the handle is accessible from the protected space formed by the cab of the golf cart.

* * * * *